(12) United States Patent
Araki et al.

(10) Patent No.: US 6,839,313 B2
(45) Date of Patent: Jan. 4, 2005

(54) INFORMATION RECORDING AND REPRODUCING APPARATUS

(75) Inventors: Yoshitsugu Araki, Tsurugashima (JP); Takanori Maeda, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 504 days.

(21) Appl. No.: 10/067,770

(22) Filed: Feb. 8, 2002

(65) Prior Publication Data

US 2002/0110053 A1 Aug. 15, 2002

(30) Foreign Application Priority Data

Feb. 9, 2001 (JP) .................................... P2001-033962

(51) Int. Cl.⁷ ................................................ G11B 7/00
(52) U.S. Cl. ................ 369/112.01; 369/94; 369/112.23
(58) Field of Search ........................... 369/44.23, 44.24, 369/44.32, 94, 112.01, 112.23

(56) References Cited

U.S. PATENT DOCUMENTS 5,764,606 A    6/1998  Fukumoto et al. ....... 369/44.41
5,768,251 A *  6/1998  Ito et al. .................. 369/275.1

FOREIGN PATENT DOCUMENTS

| EP | 0 749 116 | 12/1996 |
| JP | 11-242824 | 9/1999 |

* cited by examiner

*Primary Examiner*—Paul W. Huber
(74) *Attorney, Agent, or Firm*—Morgan, Lewis & Bockius LLP

(57) ABSTRACT

An information recording and reproducing apparatus for optically recording/reproducing information to/from a two-layer optical disk comprises a cylindrical lens, which gives astigmatism to a reflected light from a target information recording layer, two caustic curve positions are arranged in the front and in the rear of the optical detector, and an unnecessary reflected light from an another information recording layer has two caustic curve positions arranged in the rear of the optical detector. In this condition, assuming an astigmatism direction of the cylindrical lens is inclined at 45 degree angle to a track direction, a projected image of the target information recording layer is inclined at 90 degree angle to an another projected image of the another information recording layer in a light receiving surface of the optical detector.

3 Claims, 6 Drawing Sheets

INFORMATION RECORDING AND REPRODUCING APPARATUS

BACKGROUND OF THE INVENTION

1. Field of the Invention

The present invention relates to an information recording and reproducing apparatus for recording and reproducing information to or from a multilayer optical information recording medium having a multilayer formation made of a plurality of information recording layers on which information is recorded.

2. Related Background Art

In recent years, mass-storage optical disks, typically CD or DVD, have come into wide use. Additionally, to further improve recording densities of optical disks according to demand for recording long-time video data or the like, a multilayer optical disk having a multilayer formation of two or more information recording layers is under development. In addition, if each information recording layer is formed by a phase change recording layer, it becomes possible to realize a multilayer optical disk capable of recording information in addition to reproducing information.

The phase change recording layer of the multilayer optical disk, however, is put in a crystalline state initially before recording, while it is put in an amorphous state after the recording. In general, an unrecorded area having the phase change recording layer in the crystalline state differs from a recorded area having the phase change recording layer in the amorphous state in a reflectance and a transmittance. Assuming such a condition that an information recording layer, which is an object of recording and reproducing, is irradiated with a laser beam in recording and reproducing into a recordable two-layer optical disk and that its reflected light is received, the operation of recording and reproducing on the information recording layer near the laser source is affected by a reflectance of an underlying information recording layer. Furthermore, during recording and reproducing to or from an information recording layer far from the laser beam emitting side, it is affected by a reflectance or a transmittance of an overlying information recording layer. Unless a uniform distribution is observed in the transmittance or the reflectance of each information recording layer, an intensity distribution may be uniformless in the optical beam of an optical detector. In this condition, the transmittance can be unified in a recorded area and an unrecorded area by appropriately adjusting an absorptance of a phase change recording material of the two-layer optical disk, while it is hard to cope with the uniformless reflectance.

Particularly, in performing a tracking servo in an information recording and reproducing apparatus for recording and reproducing to or from the multilayer optical disk, a variation of the reflectance remarkably affects the tracking servo. In other words, if the recorded area is mixed with the unrecorded area in the information recording layer, components caused by the variation of the reflectance are superposed on the light intensity distribution in the optical detector. Additionally, if a reflected light from the vicinity of a boundary portion between the recorded area and the unrecorded area is asymmetric with respect to a radial direction, it causes an offset in a tracking error on the information recording layer which is an object of recording and reproducing. The offset occurs in the tracking error since the effect of the boundary portion deflects the light intensity distribution in the disk radial direction even if a track is traced accurately in detecting a tracking error in the push-pull method generally used for the information recording and reproducing apparatus. As set forth hereinabove, there has been such a problem that a performance of the tracking servo is unsuccessfully secured due to the offset of the tracking error caused by a recording condition of each information recording layer when using a recordable multilayer optical disk.

SUMMARY OF THE INVENTION

Therefore, the present invention is provided in view of these problems and it is an object of the present invention to provide an information recording and reproducing apparatus capable of performing a high-performance tracking servo by preventing a light intensity distribution from being asymmetric in an optical detector when a reflectance or the like varies in the vicinity of a boundary portion between a recorded area and an unrecorded area of each information recording layer and by detecting an accurate tracking error when information is recorded and reproduced to or from a multilayer optical information recording medium.

In one aspect of the present invention, there is provided an information recording and reproducing apparatus for optically recording/reproducing information on/from an information recording medium having a plurality of information layers by concentrating a light beam on tracks of each information layer. The apparatus is provided with: comprising an optical receiving device for receiving a reflected light from said each information layer to output a light receiving signal on the basis of a projected image formed on a light receiving surface thereof; a tracking error detecting device for detecting a tracking error on the basis of said light receiving signal; a rotating device for rotating one projected image on said light receiving surface at a predetermined angle with respect to another projected image, said one projected image corresponding to a reflected light from a target information layer for recording/reproducing, said another projected image corresponding to a reflected light from another information layer except said target information layer.

According to this aspect, an optical receiving device receives a reflected light from said each information layer to output a light receiving signal on the basis of a projected image formed on a light receiving surface thereof. Then, a tracking error detecting device detects a tracking error on the basis of said light receiving signal. A a rotating device rotates said one projected image on said light receiving surface at a predetermined angle with respect to said another projected image. Therefore, with a configuration capable of achieving said one projected image rotated at a predetermined angle with respect to another projected image, it becomes possible to avoid the effect of the asymmetric light intensity distribution in the disk radial direction, which is asymmetric due to a difference of a reflectance between a recorded area and an unrecorded area in the disk, so as to prevent an occurrence of the offset of the tracking error.

In another aspect, in the information recording and reproducing apparatus, said rotating device includes an astigmatism generation device for generating astigmatism in passing reflected light; said astigmatism generation device is arranged such that its astigmatism direction in said reflected light is inclined at an angle corresponding to said predetermined angle of said one projected image to a track direction; and said optical receiving device is arranged between two caustic curve positions of said reflected light from said target information layer and arranged in a position farther or nearer than caustic curve positions of said reflected light from said another information recording layer.

According to this aspect, said rotating device includes astigmatism generation device for generating astigmatism in passing reflected light. Then said astigmatism generation device is arranged such that its astigmatism direction in said reflected light is inclined at an angle corresponding to said predetermined angle of said one projected image to a track direction. While said optical receiving device is arranged between two caustic curve positions of said reflected light from said target information layer and arranged in a position farther or nearer than caustic curve positions of said reflected light from said another information recording layer.

Therefore, when the reflected light is guided to the optical receiving device, an astigmatism is given by the astigmatism generation device, thereby generating a positional relation in which one of the caustic curve positions of said reflected light from said target information layer is near the optical receiving device and the other is far from the optical receiving device. On the other hand, two caustic curve positions of said reflected light from said another information recording layer do not have the above positional relation, but both of them are located in the same side of the optical receiving device. As a result, said one projected image in the optical receiving device is rotated in a contrary direction around the astigmatism direction, thereby rotating at said predetermined angle in the reflected light receiving surface taking into consideration symmetricity in detecting a tracking error. Therefore, only with an arrangement of the astigmatism generation device in the optical system, it becomes possible to prevent an offset of the tracking error reliably as set forth in the above.

In further aspect, in the information recording and reproducing apparatus, said astigmatism generation device comprises a cylindrical lens having a permeable plain surface perpendicular to the axis of said reflected light and is arranged such that its astigmatism direction in said reflected light is inclined at 45 degree to said track direction; said optical receiving device is segmented into two sections by a parting line perpendicular to said track direction, and said tracking error detecting device detects a tracking error on the basis of the difference between light receiving signals respectively output from said two sections.

According to this aspect, said astigmatism generation device comprises a cylindrical lens having a permeable plain surface perpendicular to the axis of said reflected light and is arranged such that its astigmatism direction in said reflected light is inclined at 45 degree to said track direction. Then said optical receiving device is segmented into two sections by a parting line perpendicular to said track direction. While said tracking error detecting device detects a tracking error on the basis of the difference between light receiving signals respectively output from said two sections.

Therefore, said one projected image rotated at 90 degree as set forth in the above is acquired by devices of the optical system, by which the track-wise line of said other information recording layer except said target information layer becomes orthogonal to the parting line, thereby canceling the asymmetricity of the light intensity distribution so as to prevent an occurrence of the offset of the tracking error reliably. And the optical system is configured by using a cylindrical lens as the astigmatism generation devaice, thereby achieving the same action as for the invention in the above by a simple configuration.

DETAILED DESCRIPTION OF THE PREFERRED EMBODIMENTS

The preferred embodiments of the present invention will now be described in detail hereinafter with reference to the accompanying drawings.

Figure 1:
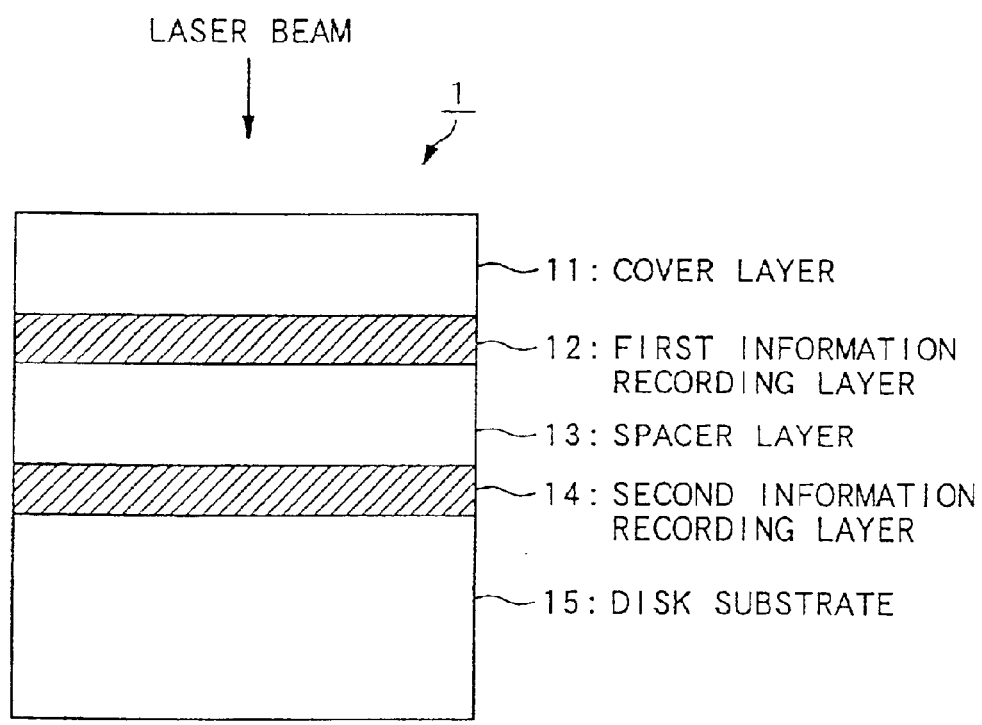
FIG. 1 is a diagram showing a sectional structure of a two-layer optical disk which is a typical multilayer optical information recording medium in this embodiment.

Referring to FIG. 1, there is shown a diagram of a sectional structure of a two-layer optical disk 1 which is an example of a multilayer optical information recording medium according to this embodiment. As shown in FIG. 1, the two-layer optical disk 1 has a sectional structure formed by a cover layer 11, a first information recording layer 12, a spacer layer 13, a second information recording layer 14, and a disk substrate 15 sequentially. When an information recording and reproducing apparatus according to this embodiment described later records information on the two-layer optical disk 1, a laser beam is emitted from the upper side in FIG. 1.

In FIG. 1, the cover layer 11 is used for protecting the first information recording layer 12, having a given thickness. The first information recording layer 12, which has a phase change recording layer for recording information on the basis of a phase change, is a recording layer located relatively near the laser beam emitting source. The spacer layer 13 is a transparent layer arranged between the first information recording layer 12 and the second information recording layer 14. The second information recording layer 14, which has a phase change recording layer in the same manner as for the first information recording layer 12, is a recording layer located relatively far from the laser beam emitting source. The disk substrate 15 is a substrate having a given thickness, made of polycarbonate material or the like.

In the above two-layer optical disk 1, the phase change recording layers formed on the first information recording layer 12 and the second information recording layer 14 are crystalline in an initial state, while their characteristic changes to an amorphous state by being irradiated with a laser beam at recording and reproducing. In other words, a recorded area in which information is recorded is put in the amorphous state and an unrecorded area is put in the crystalline state. Generally, a reflectance to a laser beam depends upon the crystalline state or the amorphous state on the basis of characteristics of the phase change recording material. In other words, the reflectance varies according to the recorded area or the unrecorded area in the first information recording layer 12 or the second information recording layer 14.

For the two-layer optical disk 1 having the sectional structure in FIG. 1, recording into the first information recording layer 12 is affected by a reflectance of the second information recording layer 14. In other words, when a laser beam is condensed on the first information recording layer 12 and its reflected light is detected by an optical detector, a reflected light from the second information recording layer 14 reaches the optical detector as a stray light component and therefore a detected level varies according to the reflectance. In addition, recording into the second information recording layer 14 is affected by a reflectance of the first information recording layer 12. In other words, a laser beam passes through the first information recording layer 12 when it is condensed on the second information recording layer 14, and therefore a reflected light from the first information recording layer 12 have an effect with the same action as for the above.

Figure 2:
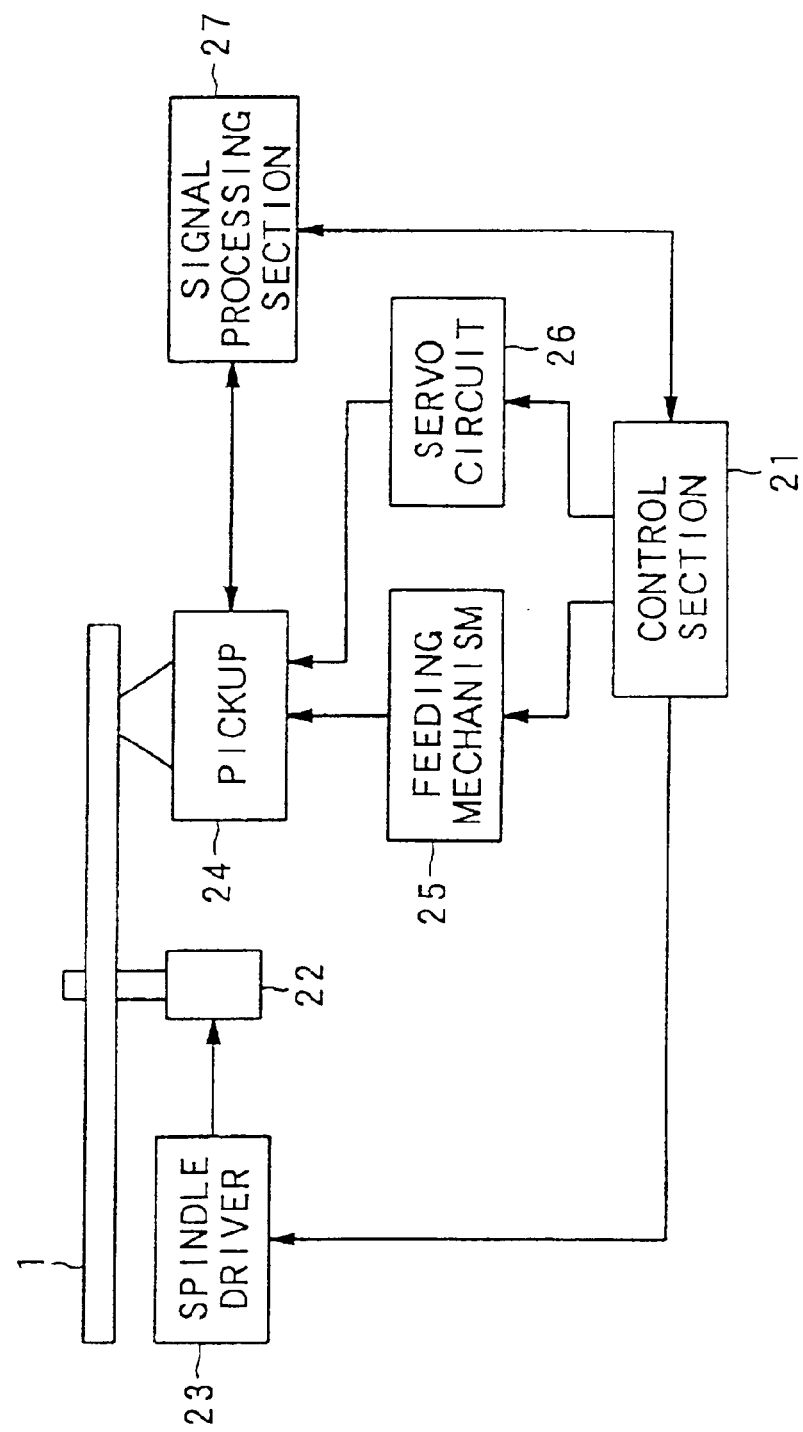
FIG. 2 is a block diagram showing a schematic configuration of an information recording and reproducing apparatus according to this embodiment.

Next, referring to FIG. 2, there is shown a block diagram of a schematic configuration of the information recording and reproducing apparatus according to this embodiment. The information recording and reproducing apparatus shown in FIG. 2 comprises a control section 21, a spindle motor 22, a spindle driver 23, a pickup 24, a feeding mechanism 25, a servo circuit 26, and a signal processing section 27 and performs a recording operation of the mounted two-layer optical disk 1.

In the above arrangement, the control section 21 controls the recording operation of the information recording and reproducing apparatus as a whole. The control section 21 is connected to respective components shown in FIG. 2 to control the operation by exchanging data or control signals. This control section 21 has a role of selecting an information recording layer to be an object of recording and reproducing at recording and reproducing processing and determining a recording position.

The two-layer optical disk 1 mounted on the information recording and reproducing apparatus is irradiated with a laser beam by the pickup 24 while it is driven rotatively by the spindle motor 22. In this condition, the spindle driver 23 controls the rotation of the spindle motor 22 so that a regular linear velocity is maintained for the two-layer optical disk 1.

The feeding mechanism 25 controls a movement of the pickup 24 in a radial direction of the two-layer optical disk 1 by driving and controlling a feeding motor so as to move the pickup 24 to a track position corresponding to the above recorded area at recording and reproducing. The servo circuit 26 controls an actuator of the pickup 24 for a focusing servo and a tracking servo. The signal processing section 27 drives and controls a semiconductor laser of the pickup 24 on the basis of the recorded information and performs signal processing for generating various signals on the basis of a light receiving output of the pickup 24.

Subsequently, in this embodiment, the pickup 24 detects a tracking error in the push-pull method so as to enable the servo circuit 26 to perform a tracking servo. In this condition, the pickup 24 detects the tracking error on the basis of a differential output between a disk inner circumferential side and a disk outer circumferential side at tracing on tracks. If a recorded area is mingled with an unrecorded area on the two-layer optical disk 1 as set forth in the above, then there is a problem that an offset of the tracking error is caused by an effect of their boundary portion.

Figure 3A:
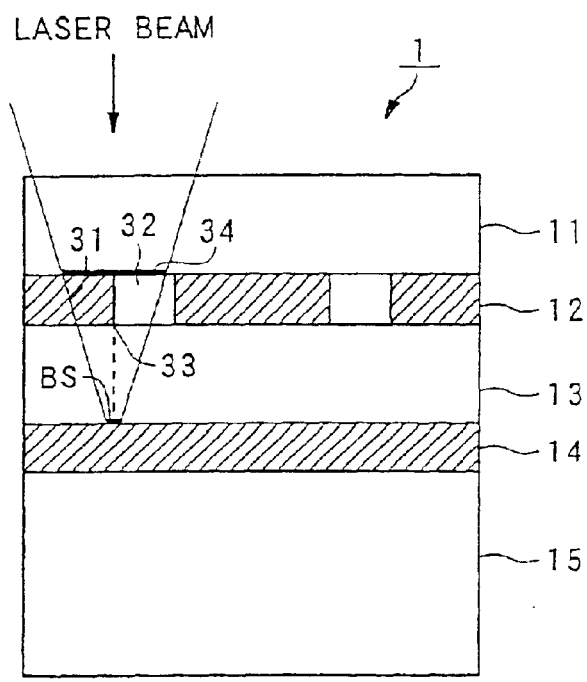
FIG. 3A is a cross section of diagram of assistance in explaining a condition in which recording and reproducing to or from a second information recording layer of the two-layer optical disk is affected by a first information recording layer.

Referring to FIG. 3, there is shown a diagram of assistance in explaining a condition affected by the first information recording layer 12 at recording and reproducing to or from the second information recording layer 14 of the two-layer optical disk 1. FIG. 3A shows a condition of a cross section at recording and reproducing to or from the second information recording layer 14, in which a recorded area 31 where information has already been recorded is adjacent to an unrecorded area 32 maintaining an initial state in a boundary portion 33 in the first information recording layer 12. In other words, the cross section is put in the condition shown in FIG. 3A if a part of a track range remains in the initial state when information is written into the first information recording layer 12 a plurality of times.

On the other hand, the laser beam emitted from the side of the cover layer 11 passes through the first information recording layer 12 and is condensed on the second information recording layer 14 to form a beam spot BS. In this condition, as shown in FIG. 3A, an irradiated area 34 of the first information recording layer 12 is irradiated in a defocus state with the laser beam and a reflection of its partial area affects a reflectance in the irradiated area 34. Then, there occurs a tracking error offset problem due to an action described later when the irradiated area 34 in the first information recording layer 12 overlaps the boundary portion 33 as shown in FIG. 3A.

Figure 3B:
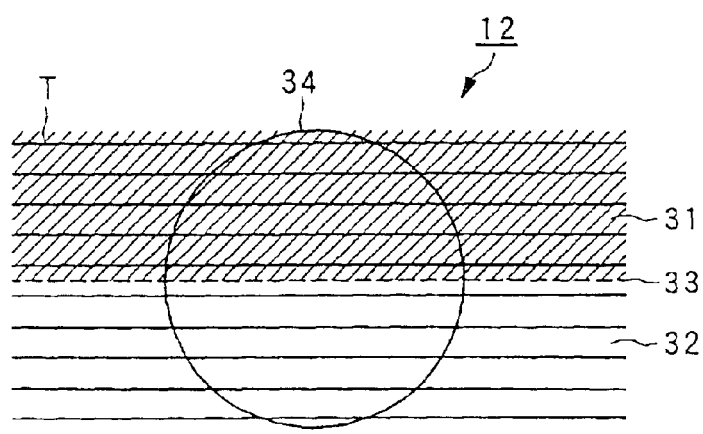
FIG. 3B is a plain diagram of assistance in explaining a condition in which recording and reproducing to or from a second information recording layer of the two-layer optical disk is affected by a first information recording layer.

Referring to FIG. 3B, there is shown a diagram of assistance in typically explaining a condition of the first information recording layer 12, which is a top view of FIG. 3A. As shown in FIG. 3B, the irradiated area 34 in the first information recording layer 12 is in the defocus state and therefore spreads in a relatively wide area including a plurality of tracks T (FIG. 3B shows an example in which the irradiated area 34 includes ten tracks T). Correspondently with FIG. 3A, a center of the irradiated area 34 almost matches the boundary portion 33 and the irradiated area includes almost the same area of the recorded area 31 as for the unrecorded area 32.

Generally, a reflectance of the phase change recording layer in the crystalline state is higher than that a reflectance in the amorphous state and therefore a reflectance of the unrecorded area 32 is lower than a reflectance of the recorded area 31. Accordingly, the reflected light from the irradiated area 34 is received by the pickup 24 in a state of an asymmetric light intensity distribution in the disk radial direction. As a result of a superposition of this light on the reflected light from the second information recording layer 14, an offset occurs in the tracking error as described later.

Figure 4:
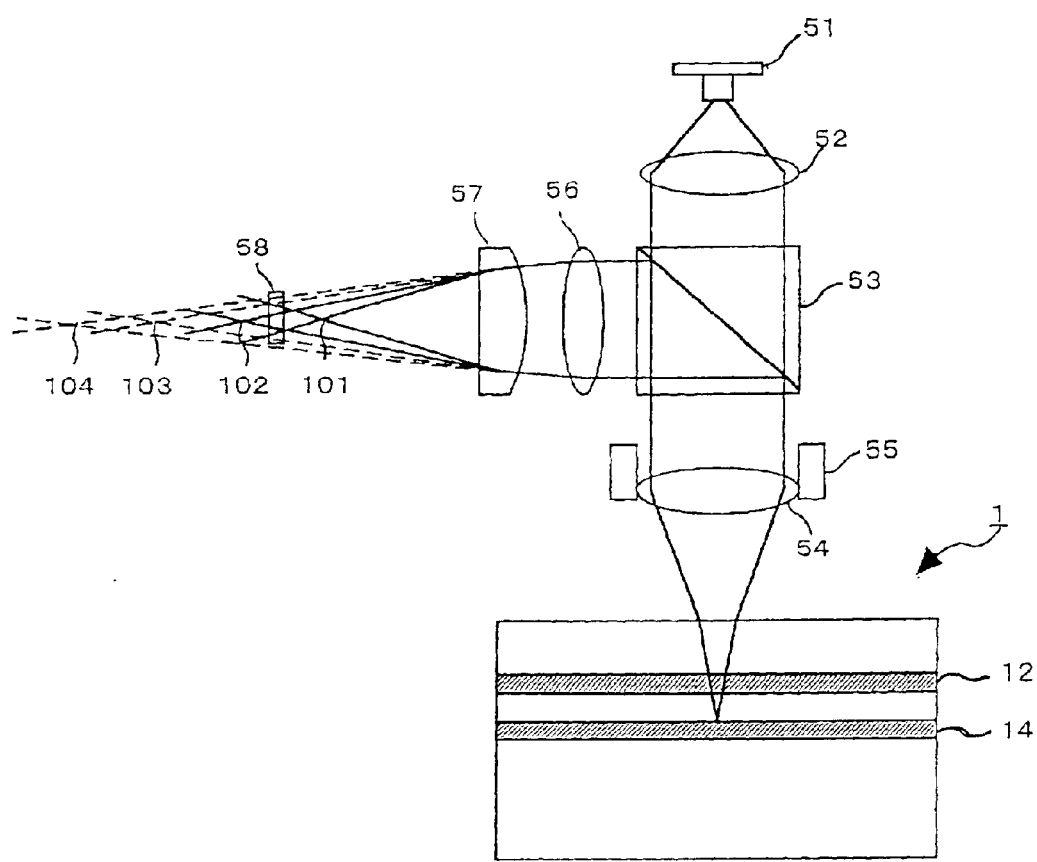
FIG. 4 is a block diagram showing an arrangement of an optical system of the information recording and reproducing apparatus according to this embodiment.

In this embodiment, a configuration of an optical system prevents the above problem. The optical system according to this embodiment will be described in detail hereinafter by using FIG. 4 to FIG. 6. Referring to FIG. 4, there is shown a block diagram of the configuration of the optical system of the information recording and reproducing apparatus according to this embodiment. As shown in FIG. 4, the optical system of the information recording and reproducing apparatus comprises a semiconductor laser 51 which is a light source, a collimater lens 52, a beam splitter 53, an objective lens 54, a focus actuator 55, a condensing lens 56, a cylindrical lens 57, and an optical detector 58. With this configuration, the first information recording layer 12 or the second information recording layer 14 of the two-layer optical disk 1 is irradiated with a laser beam to record or reproduce information. In FIG. 4, there is shown such a condition that a laser beam is condensed with the second information recording layer 14 to be an object of recording and reproducing.

In FIG. 4, the semiconductor laser 51 is driven by appropriate power at recording or reproducing to emit a laser beam. This laser beam is changed to a parallel light by the collimater lens 52 and is incident on the objective lens 54 passing through the beam splitter 53. Then, the laser beam is condensed by the objective lens 54 so as to form a beam spot in a predetermined converging position on the first information recording layer 12 or the second information recording layer 14 of the two-layer optical disk 1. At this point, the focus actuator 55 controls the position of the objective lens 54 as well as the converging position by moving it in the optical axis direction.

Next, the reflected light from the above converging position is incident again on the objective lens 54 and guided to the beam splitter 53. The beam splitter 53 splits the optical beam and one of the optical beams passes through the condensing lens 56 and the cylindrical lens 57. The condensing lens 56 is a convex lens for condensing the optical beam to the optical detector 58. On the other hand, the cylindrical lens 57 has a role of astigmatism generation means according to this embodiment, having a linear cross section in the crosswise direction and an arc cross section in the lengthwise direction. The cylindrical lens 57 acts as a convex lens only in a single direction (hereinafter, referred to as astigmatism direction) by using the astigmatism for the incident optical beam and acts as a parallel flat plate in a direction perpendicular to the direction.

Therefore, the optical beams passing through the cylindrical lens 57 converge with different focal lengths between the astigmatism direction and its perpendicular direction. As shown in FIG. 4, the reflected lights from the second information recording layer 14 are converged on the front-side caustic curve position 101 in the astigmatism direction of the cylindrical lens 57 and on the rear-side caustic curve position 102 in the direction perpendicular to the astigmatism direction, respectively. Caustic curves are formed in the front-side caustic curve position 102 and the rear-side caustic curve position 101, respectively, and they are perpendicular to each other. Furthermore, the astigmatism direction of the cylindrical lens 57 is inclined at 45 degree angle to the disk radial direction (a direction within a sheet) (also inclined at 45 degree to the track direction) in this embodiment and details of a mechanism on it will be described later.

The optical detector 58 receives the optical beam which has passed through the condensing lens 56 and the cylindrical lens 57 by means of a light receiving surface having a segmented configuration. A reproduction signal is generated on the basis of the light receiving output in the optical detector 58 and a tracking error and a focusing error are detected. As shown in FIG. 4, the optical detector 58 is arranged at a point midway between the front-side caustic curve position 101 and the rear-side caustic curve position 102. The position of the optical detector 58 corresponds to the position of the minimum circle of confusion where an optical beam forms a circle.

In FIG. 4, there is shown an optical path (indicated by a dashed line) of the reflected light from the first information recording layer 12 not to be an object of recording and reproducing in addition to an optical path (indicated by a solid line) of the reflected light from the second information recording layer 14 to be an object of recording and reproducing. For the first information recording layer 12, the reflected light of the optical beam applied in a defocus state reaches the cylindrical lens 57 following the same path as for the reflected light from the second information recording layer 14. Then, an image corresponding to the first information recording layer 12 is projected to a front-side image position 103 in the astigmatism direction of the cylindrical lens 57 and to a rear-side image position 104 in a direction perpendicular to the above direction. These front-side image position 103 and the rear-side image position 104 correspond to two caustic curve positions corresponding to the first information recording layer 12, respectively.

In this condition, the first information recording layer 12 is nearer to the objective lens 54 than the second information recording layer 14, thereby being projected to a position relatively far via the condensing lens 56 and the cylindrical lens 57. As a result, as shown in FIG. 4, both of the front-side image position 103 and the rear-side image position 104 are far from the optical detector 58, thereby having different conditions of the arrangement from those of the front-side caustic curve position 101 and the rear-side caustic curve position 102 corresponding to the second information recording layer 14.

In FIG. 4, the projected image of the reflected light from the second information recording layer 14 is rotated around the astigmatism direction of the cylindrical lens 57 in the front-side caustic curve position 101 and is rotated around a direction perpendicular to the astigmatism direction of the cylindrical lens 57 in the rear-side caustic curve position 102. Then, with the arrangement of the optical detector 58 as set forth in the above, the optical detector 58 obtains a projected image having a reflection of only the reversal at the front-side caustic curve position 101 located this side of the optical axis in its light receiving surface. On the other hand, while the reflected light from the first information recording layer 12 is rotated at the front-side image position 103 in the same manner as for the rear-side image position 104, both of the positions are located in the rear of the optical axis relative to the optical detector 58 and therefore the projected image is not rotated in the position of the optical detector 58.

Figure 5:
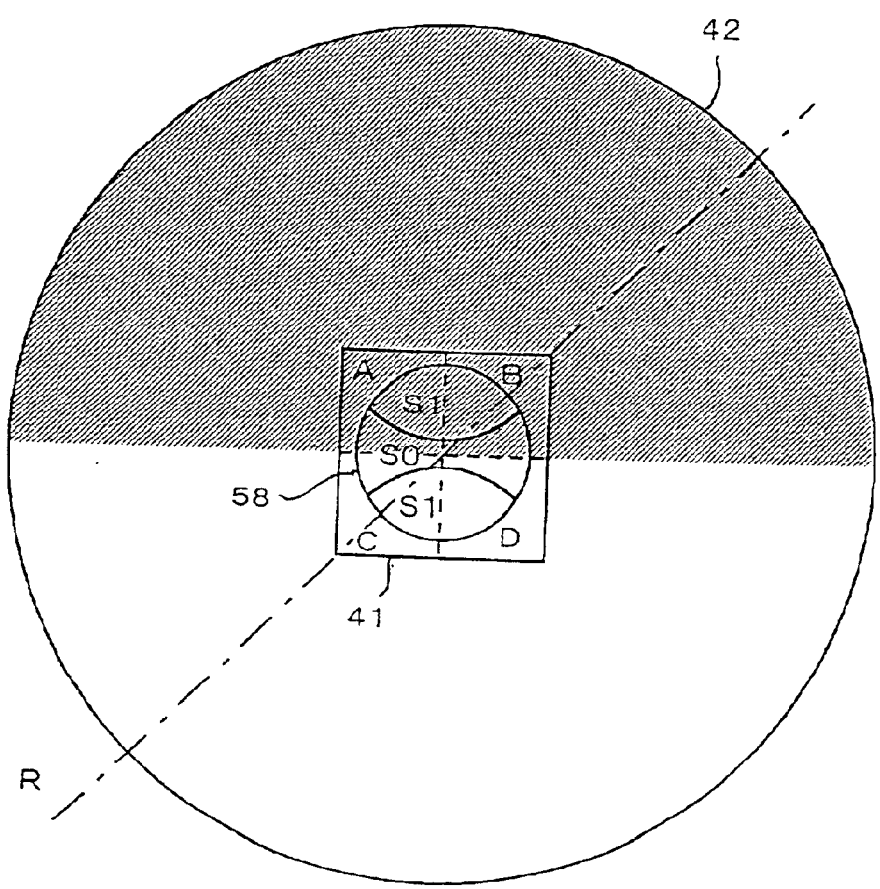
FIG. 5 is a diagram showing a projection pattern corresponding to the condition shown in FIG. 3 in a light receiving surface of an optical detector without an action of a cylindrical lens (conventional configuration)
Figure 6:
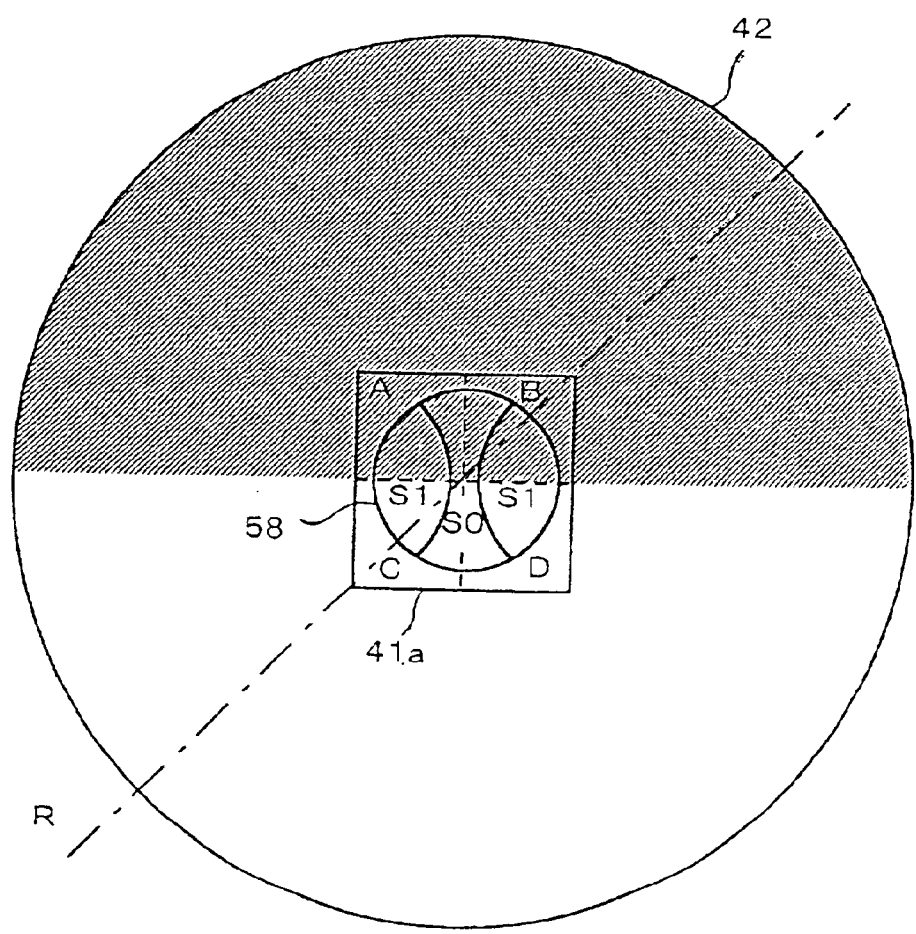
FIG. 6 is a diagram showing a projection pattern corresponding to the condition shown in FIG. 3 in a light receiving surface of an optical detector with an action of a cylindrical lens.

In this embodiment, as set forth hereinabove, it is possible to prevent an occurrence of an offset in a tracking error due to an effect of the irradiated area 34 including the boundary portion 33 by means of an action of the cylindrical lens 57. This mechanism will be concretely described by using FIG. 5 and FIG. 6. Referring to FIG. 5 and FIG. 6, there are shown diagrams of projection patterns corresponding to the condition shown in FIG. 3 in the light receiving surface of the optical detector 58; FIG. 5 corresponds to a condition in which there is no action of the cylindrical lens 57 to be compared with this embodiment (a conventional configuration) and FIG. 6 corresponds to a condition in which there is an action of the cylindrical lens 57 by means of the optical system of this embodiment.

First, the projection pattern shown in FIG. 5 includes a projected image 41 corresponding to a beam spot BS of the second information recording layer 14 and a projected image 42 corresponding to the irradiated area 34 of the first information recording layer 12 superposed on it. In addition, the optical detector 58 having a tetrameric configuration is arranged in the position of the projected image 41 corresponding to the beam spot BS.

The optical detector 58 is assumed to comprise segmented areas A, B, C, and D, with the areas A and B in one side and the areas C and D in the other side with respect to a disk radial direction. A tracking error in the push-pull method can be detected by obtaining a differential output (A+B)−(C+D)

based on respective segmented areas. On the other hand, the projected image 41 corresponding to the beam spot BS is made of a primary diffracted light S1 corresponding to a track groove superposed on a zero-order diffracted light S0 which is the main component. When the beam spot BS traces the center of the track, the primary diffracted light S1 is distributed symmetrically with respect to the track, thereby causing no tracking error.

In FIG. 5, however, the projected image 42 in the irradiated area 34 affects a tracking error. In other words, the boundary portion 34 matches the position corresponding to the track to be traced, and therefore one side of the area in the disk radial direction overlaps the recorded area 31 and the other side of the area overlaps the unrecorded area 32, thereby causing a light receiving level to be asymmetric with respect to the disk radial direction. As a result, the differential output (A+B)−(C+D) with the optical detector 58 does not equal 0 even if the beam spot BS traces the center of the track, thereby causing an offset in the tracking error.

In contrast, in a light receiving pattern shown in FIG. 6, it is understood that the projected image 41 corresponding to the beam spot BS is rotated at 90 degree angle in the light receiving surface in comparison with the image in FIG. 5. In FIG. 6 (and FIG. 5), a rotary axis R matching the astigmatism direction of the cylindrical lens 57 is indicated by a long and short dash line. As set forth in the above, the astigmatism direction of the cylindrical lens 57 is arranged so as to be inclined at 45 degree angle to the disk radial direction, and therefore a 45 degree angle is formed between the track direction (namely, a direction of the boundary portion 33) and the rotary axis R. In the direction perpendicular to the astigmatism direction of the cylindrical lens 57, the image is rotated in the front-side caustic curve position 101 as described above. Then, the projected image 41 corresponding to the beam spot BS in FIG. 5 rotates with respect to the rotary axis R and an existence of the symmetricity of the primary diffracted light S1 shifts the image into a state of being rotated at 90 degree angle in a clockwise direction in the light receiving surface as shown in FIG. 6.

With the rotation at 90 degree angle from the condition in FIG. 5 to the condition in FIG. 6 as set forth in the above, the track direction of the projected image 41 corresponding to the beam spot BS is arranged to be perpendicular to the direction of the boundary portion 34 in the projected image 42 corresponding to the irradiated area 34. At this point, the segmented areas A, B, C, and D in the optical detector 58 in the condition in FIG. 6 are arranged so that the areas A and C correspond to one side of the area in the disk radial direction and the areas B and D correspond to the other side of the area in the disk radial direction. In this condition, a tracking error in the push-pull method can be detected by obtaining a differential output (A+C)−(B+D). Therefore, the distribution of the recorded area 31 and the unrecorded area 32 in the first information recording layer 12 is not asymmetric with respect to the disk radial direction, thereby effectively preventing an occurrence of an offset in the tracking error when the beam spot BS traces the center of the track.

At this point, to acquire the above effect, a conditional expression required for configuring the optical system shown in FIG. 4 will be deduced. First, a lateral magnification, in the optical path from the two-layer optical disk to the cylindrical lens 57 in FIG. 4 is given by the following expression:

$$\beta = f(56)/f(54) \quad (1)$$

where f(54) indicates a focal length of the objective lens 54 and f(56) indicates a focal length of the condensing lens 56.

In addition, a distance r between the rear-side caustic curve position 102 and the rear-side image position 104 is given by the following expression:

$$r = d \cdot \beta^2 \quad (2)$$

where d indicates an interlayer distance between the first information recording layer 12 and the second information recording layer 14.

On the other hand, assuming that astigmatism (a distance between two caustic curves of the cylindrical lens 57) a is equal between the front-side caustic curve position 101 and the rear-side caustic curve position 102 and between the front-side image position 103 and the rear-side image position 104, the following relation obtains in the arrangement shown in FIG. 4:

$$R + a/2 > a \quad (3)$$

The following expression is deduced from the expressions (2) and (3):

$$d \cdot \beta^2 > a/2 \quad (4)$$

As set forth hereinabove, the above effect can be achieved in detecting a tracking error by arranging the optical system under the conditions satisfying the expression (4) and by providing an arrangement in which the astigmatism direction of the cylindrical lens 57 is inclined at 45 degree angle to the disk radial direction.

While the second information recording layer 14 of the two-layer optical disk 1 is described as an object of recording and reproducing in FIG. 4, the above is true if the first information recording layer 12 is considered to be an object of recording and reproducing. When the same optical system as in FIG. 4 is used, the optical path of the reflected light from the first information recording layer 12 to be an object of recording and reproducing matches the optical path corresponding to the second information recording layer 14 shown in FIG. 4. In contrast, for the reflected light from the second information recording layer 14 which is not an object of recording and reproducing, the front-side image position 103 and the rear-side image position 104 according to an action of the cylindrical lens 57 are nearer than the optical detector 58 contrarily to the arrangement in FIG. 4. With a reference of the position of the optical detector 58, however, the front-side image position 103 and the rear-side image position 104 are located in the same side, and therefore the same projection pattern as in FIG. 6 is obtained in the position of the optical detector 58. In this manner, the configuration in FIG. 4 prevents an occurrence of an offset in a tracking error in both of the first information recording layer 12 and the second information recording layer 14.

In addition, while the two-layer optical disk 1 is used in FIG. 4, the above effect is achieved also when using a multilayer optical disk in which a lot of information recording layers are formed. In this condition, there are the following requirements; the optical path of the reflected light from the predetermined information recording layer to be an object of recording and reproducing matches the optical path corresponding to the second information recording layer 14 in FIG. 4 in the same optical system as in FIG. 4 and the reflected light from other respective information recording layers has the front-side image position 103 and the rear-side image position 104 according to an action of the cylindrical lens 57 in the same side of the optical detector 58. This effectively prevents an occurrence of an offset in tracking error by avoiding an effect of the reflected light from all the information recording layers other than the object of recording and reproducing in the multilayer optical disk.

While the two-layer optical disk 1 is used as an example of a multilayer optical information recording medium in this embodiment, it is not limited to a disk-shape information recording medium, but the present invention is applicable to a multilayer optical card or a hologram or other volume recording type mediums. Furthermore, the recording medium is not limited to a multilayer optical information recording medium where a phase change recording layer is formed, but the present invention is applicable to a medium made of a pigment film or a holographic memory material.

In addition, while the cylindrical lens 57 is used as an astigmatism generation means in this embodiment, it is also possible to use a parallel flat plate arranged so as to be inclined on an optical path of a nonparallel light or to use a toric lens having surfaces of different curvatures in two directions perpendicular to each other as astigmatism generation means.

As set forth hereinabove, according to the present invention, when information is recorded in a multilayer optical information recording medium, a projected image corresponding to an information recording layer to be an object of recording and reproducing is rotated at 90 degree angle to a projected image corresponding to other information recording layers in a light receiving surface of an optical detector by an astigmatism generation means arranged in an optical system in order to prevent an effect of an existence of a boundary portion between a recorded area and an unrecorded area, thereby preventing a light intensity distribution to be asymmetric in the optical detector due to a variation of a reflectance or the like of the respective information recording layers. Therefore, it is possible to provide an information recording and reproducing apparatus capable of detecting an accurate tracking error when recording and reproducing information to or from a multilayer optical information recording medium.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-33962 filed on Feb. 9, 2001 including the specification, claims, drawings and summary is incorporated herein by reference in its entirety.

What is claimed is:

1. An information recording and reproducing apparatus for optically recording/reproducing information on/from an information recording medium having a plurality of information layers by concentrating a light beam on tracks of each information layer, comprising:

an optical receiving device for receiving a reflected light from said each information layer to output a light receiving signal on the basis of a projected image formed on a light receiving surface thereof;

a tracking error detecting device for detecting a tracking error on the basis of said light receiving signal;

a rotating device for rotating one projected image on said light receiving surface at a predetermined angle with respect to another projected image, said one projected image corresponding to a reflected light from a target information layer for recording/reproducing, said another projected image corresponding to a reflected light from another information layer except said target information layer.

2. The information recording and reproducing apparatus according to claim 1, wherein said rotating device includes an astigmatism generation device for generating astigmatism in passing reflected light, said astigmatism generation device is arranged such that its astigmatism direction in said reflected light is inclined at an angle corresponding to said predetermined angle of said one projected image to a track direction, and said optical receiving device is arranged between two caustic curve positions of said reflected light from said target information layer and arranged in a position farther or nearer than caustic curve positions of said reflected light from said another information recording layer.

3. The information recording and reproducing apparatus according to claim 2, wherein said astigmatism generation device comprises a cylindrical lens having a permeable plain surface perpendicular to the axis of said reflected light and is arranged such that its astigmatism direction in said reflected light is inclined at 45 degree to said track direction;

said optical receiving device is segmented into two sections by a parting line perpendicular to said track direction, and said tracking error detecting device detects a tracking error on the basis of the difference between light receiving signals respectively output from said two sections.

* * * * *